United States Patent
Carnero Ros et al.

(10) Patent No.: US 8,942,088 B2
(45) Date of Patent: Jan. 27, 2015

(54) BNG TO PCRF MEDIATION ENTITY FOR BBF AND 3GPP ACCESS INTERWORKING

(75) Inventors: Roberto David Carnero Ros, Madrid (ES); Maria Belen Pancorbo Marcos, Madrid (ES); Susana Fernandez Alonso, Madrid (ES); Emiliano Merino Vasquez, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 91 days.

(21) Appl. No.: 13/330,794

(22) Filed: Dec. 20, 2011

(65) Prior Publication Data
US 2013/0089013 A1    Apr. 11, 2013

Related U.S. Application Data

(60) Provisional application No. 61/544,442, filed on Oct. 7, 2011.

(51) Int. Cl.
*H04L 12/00* (2006.01)

(52) U.S. Cl.
CPC .............................. *H04L 41/08936* (2013.01)
USPC .......................................... 370/230; 370/466

(58) Field of Classification Search
CPC . H04W 4/24; H04L 12/1403; H04L 12/1407; H04L 12/14; H04L 41/0893; H04L 65/10; H04M 15/66; H04M 15/00
USPC ......... 370/229, 235, 310, 338, 351, 466, 467, 370/230
See application file for complete search history.

(56) References Cited

U.S. PATENT DOCUMENTS

| | | | |
|---|---|---|---|
| 8,131,831 B1* | 3/2012 | Hu | 709/223 |
| 2008/0034080 A1* | 2/2008 | Chamaraj et al. | 709/223 |
| 2008/0310335 A1* | 12/2008 | Wang et al. | 370/310 |
| 2009/0207759 A1* | 8/2009 | Andreasen et al. | 370/259 |
| 2010/0260125 A1* | 10/2010 | Lee et al. | 370/329 |
| 2010/0287599 A1* | 11/2010 | He et al. | 726/1 |

(Continued)

FOREIGN PATENT DOCUMENTS

WO    WO 2012/100874    *    8/2012

OTHER PUBLICATIONS

Verizon Wireless, Huawei, Proposed Updated WID: Support for Broadband Forum Accesses Interworking. TSG SA Meeting #53. No. SP-110647. Sep. 19-21, 2011.

(Continued)

*Primary Examiner* — Paul H. Masur
*Assistant Examiner* — Michael Phillips

(57) ABSTRACT

A Mediation Entity (ME) provides a single policy server common to the BroadBand Forum (BBF) fixed domain and the Third Generation Partnership Project (3GPP) mobile domain. A Policy and Charging Rules Function (PCRF) in the mobile domain provides policy control for both fixed and mobile domains. The ME in the 3GPP domain enables such PCRF approach. The ME may be introduced as a 3GPP mobile domain-based network function or element between a fixed domain-based Border Network Gateway (BNG) and the PCRF. With regard to the BBF fixed domain, the ME acts before the BNG as a Broadband Policy Control Function (BPCF), and with regard to the 3GPP mobile domain, the ME acts before the PCRF as a gateway implementing a Bearer Binding and Event Reporting Function (BBERF) or as a Policy and Charging Enforcement Function (PCEF).

21 Claims, 4 Drawing Sheets

(56) References Cited

U.S. PATENT DOCUMENTS

| | | | |
|---|---|---|---|
| 2010/0313020 A1* | 12/2010 | Montemurro | 713/168 |
| 2011/0173678 A1* | 7/2011 | Kaippallimalil et al. | 726/4 |
| 2013/0067082 A1* | 3/2013 | Khan | 709/225 |
| 2013/0229986 A1* | 9/2013 | Rasanen | 370/328 |
| 2013/0308450 A1* | 11/2013 | Zhou et al. | 370/230 |
| 2013/0318341 A1* | 11/2013 | Bagepalli et al. | 713/151 |
| 2014/0040975 A1* | 2/2014 | Raleigh et al. | 726/1 |

OTHER PUBLICATIONS

Boothe, et al. Service Quality—Managing the User Experience, Ericsson Review Feb. 1, 2011.

Zte, Procedures for PCRF Initiated S9 Session Establishment and Procedures for WLAN as Untrusted Access Interworking: Attach, Detach, Handover. 3GPP Draft; S2-104387_WAS 4331 WAS 4190 WAS 3414 3GPP BBF WLAN Call Flows for S2B and S2C. $3^{rd}$ Generation Partnership Project (3GPP). Mobile Competence Centre, Sofia-Antipolis France. Sep. 3, 2010.

WT-134, Broadband Policy Control Framework (PCF). SA WG2 Meeting #S2-87, S2-113891, Sep. 27, 2011. Jeju Island, South Korea.

Draft. WT-203. Interworking Between Next Generation Fixed and 3GPP Wireless Access. SA WG2 Meeting #S2-87, S2-113892. Sep. 27, 2011. Jeju Island, South Korea.

* cited by examiner

BNG TO PCRF MEDIATION ENTITY FOR BBF AND 3GPP ACCESS INTERWORKING

CROSS-REFERENCE TO RELATED APPLICATIONS

This application claims the priority benefit under 35 U.S.C. §119(e) of U.S. Provisional Application No. 61/544,442 filed Oct. 7, 2011, the disclosure of which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The present invention relates to communication systems. More particularly, and not by way of limitation, the present invention is directed to a method and network element for facilitating policy convergence of a mobile network domain with a broadband fixed network domain.

BACKGROUND

Nowadays there are trends to reuse architectures and technical solutions developed for different kinds of telecom networks, such as fixed broadband access networks and mobile access networks (or, more generally, Third Generation Partnership Project (3GPP) networks). This is generally known as Fixed and Mobile Convergence (FMC). Service providers are pushing for the so called FMC solutions in order to optimize their network costs and increase end user experience. In respect to FMC, two standardization organizations—3GPP and BroadBand Forum (BBF)—have started a collaboration task in order to define the required architecture for FMC. Efforts are being made in 3GPP and BBF to devise solutions that allow the technical advantages provided by any of these two network domains—i.e., the broadband fixed network domain as defined by, e.g., the BroadBand Forum, BBF, and the mobile network domain as defined, e.g., by the 3GPP—to be available to user terminals (referred generally as User Equipments or UEs), regardless of whether a UE connects to a telecom network in a wired or wireless access manner.

FIG. 1 shows an exemplary FMC (BBF-3GPP) interworking architecture 10 depicted in 3GPP Technical Specification (TS) 23.139, version 1.0.0 (August 2011), titled "3GPP System-Fixed Broadband Access Network Interworking; Stage 2" (hereafter, "TS 23.139"). In the present discussion, portions of this TS 23.139 related to policy and QoS interworking are incorporated by reference in their entireties. As is known, the TS 23.139 specifies the Stage 2 system description for interworking between a 3GPP system 12 and a Fixed Broadband Access network 14 defined by BBF to provide the Internet Protocol (IP) connectivity to a 3GPP UE (e.g., the UE 16 in FIG. 1) using a Wireless Local Area Network (WLAN) (such as, for example, a WiFi network) (not shown) and a Home Evolved Node-B (HeNB) or Home Node B (HNB) (not shown) connected to the Fixed Broadband Access network 14. The fixed network 14 and the mobile network 12 may be owned and/or operated by different service providers/operators or the same service provider/operator. In the discussion herein, terms like "Fixed Broadband Access network," "broadband fixed network domain," Broad Band Fixed network domain," and other such terms of similar import are used interchangeably to refer to a BBF defined access and network such as, for example, the network 14 in FIG. 1. Similarly, in the discussion herein, terms like "3GPP network," "3GPP mobile network domain," "mobile network domain," "mobile access network," and other such terms of similar import are used interchangeably to refer to a wireless network based on, for example, 3GPP specifications such as a 3GPP Evolved Packet Core (EPC) based system like the 3GPP Evolved Packet System (EPS) 12 shown in FIG. 1. For the sake of brevity, only a brief discussion of various elements in FIG. 1 is provided herein, while focusing in more detail on those elements that are particularly relevant to the present invention.

The upper part in FIG. 1 represents nodes in a mobile network domain 12 (referred also herein as "3GPP domain", for the sake of illustrating a preferred embodiment disclosed with respect to network arrangements disclosed by 3GPP specifications with respect to mobile networks) that comprises a 3GPP EPS 12 having a 3GPP EPC as mentioned before. The term "EPC" may generally refer to a set of Core Network (CN) nodes of an EPS domain of a 3GPP network, but excluding radio access network nodes such as GSM/Edge Radio Access Network (GERAN) nodes (wherein "GSM" refers to "Global System for Mobile Communications"), Universal Terrestrial Radio Access Network (UTRAN) nodes, Evolved UTRAN (E-UTRAN) nodes, WLAN nodes or other similar radio access network nodes. In particular, the upper part in FIG. 1 illustrates some nodes of the 3GPP EPC such as, for example, a Packet Data Network Gateway (PDN-Gw) 18, a Serving Gateway 20, and a Policy and Charging Rules Function (PCRF) 22. The Serving Gateway 20 may be coupled to the PDN-Gw 18 through an S5 reference point and to the PCRF 22 via a Gxc reference point. The PCRF 22 may be coupled to the PDN-Gw 18 via a Gx interface as shown. It is noted here that the terms "reference point" and "interface" are used interchangeably herein as can be understood from the context of discussion. In FIG. 1, the 3GPP EPS 12 is shown to also include a 3GPP access network 24, which may include, for example, the Evolved Universal Terrestrial Radio Access (EUTRA) or E-UTRAN air interface for the 3GPP Long Term Evolution (LTE) network. The access network 24 may be coupled to a Home Subscriber Server (HSS) 26 via an S6a reference point. As is understood, the HSS 26 may maintain subscription-related information (e.g., subscriber profiles) for users "homed" (as opposed to "roaming") in the service provider's EPS 12 and may also provide support with user authentication and user's service authorization status. In that regard, the HSS 26 may be coupled to a 3GPP Authentication Authorization and Accounting (AAA) server 28 via an Swx reference point. The 3GPP AAA server 28 may be coupled to the PDN-Gw 18 via an S6b reference point as shown. The 3GPP mobile network domain 12 may also include a service network 30 to provide network operator's additional IP-based services (e.g., mobile broadband or multimedia content delivery services) to users/subscribers. Such services may include, for example, the IP Multimedia Subsystem (IMS) based services, Packet-switched Streaming Service (PSS), etc. The service network 30 may be coupled to the PCRF 22 via an Rx interface and to the PDN-Gw 18 via an SGi interface as shown.

The lower part in FIG. 1 represents nodes of a Fixed Broad Band network 14, which is also referred to herein as "broadband fixed network domain" (also abbreviated as "BBF domain."). In FIG. 1, the "partition" between the 3GPP and BBF domains is represented by dotted line 31 for ease of reference. Like the 3GPP AAA server 28 in the 3GPP domain 12, the BBF domain 14 may also include a BBF AAA proxy server 32 for user authentication, authorization, and accounting functions in the BBF domain. Both of these servers 28, 32 may be coupled to each other via an STa reference point. Additionally, the BBF domain 14 may include a Broadband Network Gateway (BNG) (or Broadband Remote Access Server (BRAS)) 34 functioning as an IP Edge Router where bandwidth and QoS policies may be applied. A Broadband Policy Control Function (BPCF) 36 may be coupled to the BNG 34 to provide a Policy Decision Point (PDP) (discussed below in more detail) in the fixed network domain 14. The BPCF 36 may be coupled to its counterpart PDP in the 3GPP domain—i.e., the PCRF 22—via an S9a reference point (which is discussed in more detail below). The interconnections among the BNG 34, the BPCF 36, and the BBF AAA proxy server 32 may be as shown. Additionally, the BNG 34 may be coupled to the PDN-Gw 18 in the 3GPP domain as well. As explained in 3GPP Technical Report (TR) 23.852, in a trusted environment, the BNG 34 may be coupled to the PDN-Gw 18 via an S2a reference point, which implies a GPRS Tunnel Protocol (GTP) tunnel from BNG to PDN-Gw (wherein "GPRS" stands for "General Packet Radio Service"). In FIG. 1, the BBF domain 14 is shown to include an Access Node (AN) 38 coupled to the BNG 34. The AN 38 may implement one or more access technologies based on different communication media such as, for example, copper, fiber, or wireless. The AN 38 may include, for example, a Digital Subscriber Line Access Multiplexer (DSLAM) to provide Ethernet-based access (via copper or fiber lines) to BBF domain 14, or an Optical Network Terminal (ONT) that can convert fiber optic light signals into copper (electric) signals for processing in the BBF domain 14.

As shown in FIG. 1, the AN 38 may receive its traffic (e.g., voice calls, Internet data, multimedia content including audio and video, etc.) from a customer premises network 40, which may include a residential or corporate network (e.g., Ethernet-based, Asynchronous Transfer Mode (ATM)-based, etc.) supporting broadband access via a Residential Gateway (RG) 42 coupled to the AN 38. The customer network 40 may include one or more BBF devices 44 (e.g., a phone, a laptop computer, etc.) coupled to the RG 42 (e.g., via a wireline Ethernet connection such as, for example, a Digital Subscriber Line (DSL) cable) and configured for broadband access. Similarly, a user (i.e., a user device such as an Internet-enabled phone or computer) in the customer premises network 40 may be wirelessly connected to the RG 42 via a WiFi Access Point (AP) 45 (e.g., a wireless router), which itself may be connected to the RG 42 via a wireline connection (e.g., through a DSL modem or via an Ethernet cable). In this manner, a user in the customer network 40 may access broadband services offered through the BBF domain 14.

In FIG. 1, the dotted line 47 represents UE's 16 access to the 3GPP mobile network domain 12 using a 3GPP access (not shown), whereas the straight line 48 represents UE's connection to the mobile network domain via a WiFi network (represented by the WiFi AP 45) at the customer premises network 40. FIG. 1 specifically illustrates non-roaming FMC architecture for trusted Fixed Broadband Access network based on S2c. The S2c reference point for the connections 47-48 provides a communication channel between the terminal/UE and the PDN-Gw 18 in the mobile domain. Thus, as shown in the non-roaming scenario in FIG. 1, the UE 16 can connect to the mobile domain 12 either directly through a 3GPP access (as represented by the dotted line 47) or via the fixed broadband network 14 (as represented by the solid line 48), which, in turn, can be accessed through a customer premises network 40. The UE 16 may have been configured to process (i.e., receive and transmit) broadband multimedia content (e.g., Internet data, voice calls, audio-visual content, Voice-over-IP (VoIP), or any other multimedia content) offered through various operator-specific services (e.g., Push-to-talk over Cellular (PoC) service, an online gaming platform, UE's location-dependent content delivery service, etc.) in the 3GPP domain 12 and the BBF domain 14.

It is noted here that although FIG. 1 is related to a non-roaming situation (for the sake of simplicity), the present discussion (and invention) applies to a roaming FMC architecture as well (examples of such roaming architectures are shown in 3GPP TS 23.139). It is further noted that although there may be additional nodes/components in each of the networks 12, 14, 40 shown in FIG. 1, these additional architectural details are not shown in FIG. 1 for the sake of clarity and due to their lack of relevance to the present discussion. It is also observed that because TS 23.139 (from which FIG. 1 is taken) relates to 3GPP implementations, details of interconnections (e.g., type of interface/reference point) between BBF nodes/elements and also between nodes or units in the customer premises network are not provided in the architectural diagram shown in FIG. 1. Such details are not relevant here, but may be obtained from fixed network based BBF protocols, technical reports, or other technical literature, if needed.

For FMC purpose, 3GPP has defined a Work Item called BroadBand Access Interworking (BBAI), which is divided into three Building Blocks (BB). BB1 defines the architecture (an example of which is shown in FIG. 1) that enables a user terminal (or UE) to access services offered by the mobile operator using both fixed access and mobile access via gateways known in the 3GPP terminology as Packet Data Network Gateways (PDN-Gw). This is a pure interworking scenario, in which there are two separated networks—mobile (according to 3GPP EPC network architecture) 12 and fixed (according to BBF architecture) 14. The existence of two separated networks 12, 14 implies that the fixed network 14 and the mobile network 12 may belong to different operators or to the same operator, but there are two policy nodes that, as Policy Decision Points (PDP), can intervene in any case for making policy decisions with regard to a UE's data communications—a BPCF (e.g., the BPCF 36 in FIG. 1) as a PDP for the fixed network 14, and a PCRF (e.g., the PCRF 22) as a PDP for the mobile network 12.

Thus, although policy management solutions addressing policies for access control, Quality of Service (QoS) control and enforcement, and charging, have been deployed for both kinds of network domains (i.e., fixed and mobile network domains), with regard to QoS control and enforcement, these solutions comprise, essentially, two types of nodes: (1) PDPs implemented by nodes (e.g., BPCF 36 and PCRF 22) acting as policy servers (in respective domains) and deciding the policies (QoS policies) with regard to a UE's data communication, and (2) Policy Enforcing Points (PEP) commonly implemented by nodes routing data packets of data communications and communicating with PDPs to put into force the policies decided by these PDPs with respect to the data communications the PDPs process. In the fixed domain 14, the BNG 34 may function as a PEP, whereas in the mobile domain 12 a Bearer Binding and Event Reporting Function (BBERF) (not shown) may function as a PEP under the Policy and Charging Control (PCC) architecture for a 3GPP core network as disclosed in 3GPP TS 23.203, version 11.3.0

(September 2011), titled "Policy and Charging Control Architecture" (hereafter "TS 23.203"), the disclosure of which is incorporated herein by reference in its entirety.

As noted above, with regard to policies (e.g., QoS policies) to be decided in respect to a data communication of a user terminal (or UE), the currently envisaged FMC solutions comprise the use of two PDPs—a first one (i.e., the BPCF 36) in the broad band fixed domain 14 and a second one (i.e., the PCRF 22) in the 3GPP mobile domain 12. As shown in FIG. 1, these two PDPs communicate through an interface named as "S9a" (or as "S9*" in other specifications). The interface "S9a" envisaged for FMC is inspired in the functionality of the "S9" interface disclosed in 3GPP TS 23.203 mentioned above. The "S9" interface envisaged in TS 23.203 relates to pure 3GPP roaming situations wherein two PDPs in the mobile domain (i.e., two PCRFs) intervene in a data communication of a (roaming) UE—one PCRF residing in the home 3GPP domain (the so-called Home-PCRF or H-PCRF) (not shown), and the other one residing in the visited 3GPP domain (the so-called Visited-PCRF or V-PCRF) (not shown). In other words, the BPCF-PCRF relation by S9a (in the FMC architecture 10 in FIG. 1) may be considered to be conceptually similar to the relation between the V-PCRF and the H-PCRF via S9 in pure 3GPP roaming scenarios.

The foregoing described initiatives by 3GPP to offer FMC solutions. However, it is noted that BBF is also working at the same time on the requirements regarding what the support of 3GPP BBAI BB1 implies in the fixed network. The Broad-Band Forum Working Text (WT)-203, revision 9 (August 2011), titled "Interworking between Next Generation Fixed and 3GPP Wireless Access" (hereafter "WT-203"), documents BBF's efforts to accommodate 3GPP interworking initiatives in the fixed domain. In the present discussion, portions of WT-203 related to policy and QoS interworking are incorporated by reference in their entireties. It is observed, however, that both 3GPP BBAI BB1 and BBF WT-203 assume exclusively an interworking scenario—i.e., two separated networks (fixed and mobile), with separated Authentication Authorization and Accounting (AAA) servers, gateways and policy managers. Only the interconnection mechanisms (like the "S9a" and "STa" reference points shown in FIG. 1) are defined, and no further convergence is proposed. Rather, convergence is a topic for 3GPP BBAI BB3, the scope of which is not yet commonly agreed by the industry.

A brief description of how policy framework is currently implemented in a broadband fixed network domain is now provided with reference to the fixed network domain 14 shown in FIG. 1. It is observed initially that Fixed Access Service Providers have very big and highly customized network deployments, with a policy framework commonly using a Remote Authentication Dial-In User Server/Service (RADIUS) protocol based infrastructure. In summary, there are two RADIUS-based mechanisms for implementing the policy framework in fixed access networks: (1) Proxy mode: In this mode, at IP session establishment, and when the BNG 34 sends the RADIUS Accounting Start towards the BBF AAA server 32, the AAA server 32 may forward such message towards the Policy Manager or BPCF 36. The BPCF 36 acknowledges the reception of such RADIUS Accounting message to the AAA 32, and the AAA 32 sends the acknowledge message towards the BNG 34. (2) Sidecar mode: In this mode, at IP session establishment, the BNG 34 sends the RADIUS Accounting Start towards both the AAA server 32 and the Policy Manager or BPCF 36. The BPCF 36 acknowledges the reception of such RADIUS Accounting Start message to the BNG 34.

Once the BPCF 36 gets the RADIUS Accounting Start message (whether in proxy mode or sidecar mode), it can make the policy decisions and may request the enforcement of the applicable policies. For such purpose, the BPCF 36 sends a RADIUS Change Of Authorization (COA) message towards the BNG 34 including the applicable policies.

Thus, from the above description of the proxy and sidecar modes and BPCF's response through a RADIUS COA message, it is seen that, in the fixed domain 14, the BNG 34 receives policies under a "push" model, i.e., in an unsolicited way, because there is no previous policy request—direct or indirect—from the BNG towards the Policy Manager or BPCF. (The RADIUS Accounting Start message is not in fact a policy request; it is just the sending of accounting data to be used for charging purposes). In contrast, the 3GPP PCC architecture for a 3GPP-EPC network in the mobile domain 12 is based on a "pull" model at IP Connectivity Access Network (IP-CAN) session establishment/modification, wherein a Gateway (GW) or Policy and Charging Enforcement Function (PCEF) (such as, for example, the PDN-Gw 18 in FIG. 1) receives policies to be enforced from a policy manager/PDP (e.g., the PCRF 22 in FIG. 1) upon request from the GW/PCEF. (See, for example, 3GPP TS 23.203, FIG. 7.2-1: interaction in flows 3 and 10 between the illustrated Gateway (GW) (which can be a PDN-Gw) and the policy manager PCRF). As mentioned before, instead of a PCEF as a PEP, a BBERF may function as a PEP as well.

SUMMARY

It is observed from the above discussion that the current domain-specific PDP based FMC interworking solution results in two separate PDPs—one (i.e., BPCF) in the fixed domain and the other (i.e., PCRF) in the mobile domain. However, this solution is disparate on each domain, since the functionality disclosed/required for these PDP (and corresponding PEP) nodes is not exactly the same, nor do these nodes use the same or equivalent signaling flows. Even the communication protocol is not the same between the fixed and mobile domains—the fixed domain primarily has the RADIUS protocol based infrastructure whereas the mobile domain prefers the Diameter protocol. An example of such disparity is evident from the above discussion regarding how a PEP receives a policy in each domain—via the "push" model in the fixed domain versus the "pull" model in the mobile domain. Furthermore, the use of two PDPs in a communication results in some drawbacks. For example, it requires more signaling between all involved decision (PDPs) and enforcing (PEPs) points, and may also require some coordination of policy rules between the PDPs (e.g., with respect to the same user or UE), which can complicate, for example, the data provisioning of a plurality of PDPs (e.g., with respect to the same user).

The two PDP-based interworking proposed currently (i.e., BPCF in the fixed site and PCRF in the 3GPP side, and an S9a reference point therebetween) does not result in any policy convergence between two domains. There are two more alternatives to the above-described two PDP-based "solution," but each has its own problems. For example, BBF currently defines one reference point, called "R", with specific functions (and a protocol model based on RADIUS/RADIUS COA), and 3GPP proposes Gx/Gxx reference points (based on Diameter protocol). So, one possible solution for policy-related FMC may be for the BNG (in the fixed domain) to support 3GPP's Gx/Gxx interfaces. In that case, BNG must follow 3GPP architecture. Because BNG node is defined by the BroadBand Forum (BBF) and not by 3GPP, such requirement may impact legacy BNGs in existing fixed networks. However, because of their very big and highly customized network deployments, Fixed Access Service Providers do not see any advantage of such architecture in comparison with the costs and risks of such network change. The fixed network service providers would rather prefer to build their network evolution based on its current architectural deployments. Therefore, fixed service providers cannot be expected to migrate to a 3GPP-based architecture, at least in the short or medium-term (e.g., the next 3-5 years). The second possible solution for policy-related FMC may be for the PCRF (in the mobile domain) to support BBF's "R" interface, which may require following BBF architecture and protocols in the 3GPP domain. However, 3GPP is not willing to support RADIUS based standards, and, furthermore, such BBF-based architectural requirement may affect 3GPP legacy systems as well.

It is therefore desirable that if one wishes to move towards a convergence solution in the policy area (even if it is for the short term until complete convergence is worked out by 3GPP and BBF), one may need to minimize the possible impacts on the interfaces that current BNG nodes support so as not to be burdensome to current broadband fixed network installations.

The present invention is directed to a network element or function in the mobile network domain that interfaces between a PEP (e.g., a Broadband Network Gateway (BNG)) in the fixed network domain and a PDP (e.g., a Policy and Charging Rules Function (PCRF)) in the mobile network domain to facilitate convergence of the fixed and mobile network domains in the area of policy management.

The present invention provides a solution to the above-mentioned problem of convergence of the fixed and mobile network domains in the area of policy management. The present invention contemplates, in a preferred embodiment, making 3GPP PCC architecture as the basis for the FMC architecture to provide interworking between the fixed and mobile domains without the need to have a domain-specific PDP in each domain (i.e., a first policy server PDP—e.g., a BPCF—in the broadband fixed network domain, and a second policy server PDP—e.g., a PCRF—in the mobile network domain). Instead of the dual PDP-based solution (e.g., based on the use of a BPCF and of a PCRF) that is envisaged by current 3GPP and BBF studies (e.g., 3GPP BBAI BB1, and WT-203 mentioned earlier), the present invention proposes one single policy server common to both of these domains. A single policy server—e.g., a PCRF in the mobile domain—can provide policy control for both fixed broadband and mobile accesses. This invention proposes a mechanism (or translation agent) for enabling such PCRF approach, while minimizing the impacts on currently deployed fixed networks. Hence, to implement such solution, the present invention offers the introduction of a new 3GPP mobile domain-based network function or element between the fixed domain-based BNG and such PCRF. This network function or element is referred to herein as a "Mediation Entity" (or "ME"). With regard to the broadband fixed network domain, the ME acts before the BNG (which is, in general, a PEP in the fixed domain) as a BPCF (i.e., as if the ME were a PDP), and, with regard to the 3GPP-EPC mobile network domain, the ME acts before the PCRF (which is, in general, a PDP in the mobile domain) as a gateway implementing a BBERF or as a PCEF, depending on the mobile domain's architecture (i.e., as if the ME were a PEP in the mobile domain). In one embodiment, the ME is implemented as a stand-alone node. In another embodiment, the ME can be co-located within a node implementing the PCRF functionality. Therefore, the legacy infrastructure currently used in fixed broadband networks is not impacted.

In one embodiment, the present invention is directed to a network element that is configured to be a part of a mobile network domain (e.g., as defined by 3GPP) and to facilitate policy convergence of the mobile network domain with a broadband fixed network domain (e.g., as defined by the BroadBand Forum (BBF)). The mobile network domain comprises a 3GPP Evolved Packet Core. The network element is further configured to function as a Policy Decision Point/policy server (PDP) for a Broadband Network Gateway (BNG) (which may be a Policy Enforcing point (PEP)) in the fixed network domain (e.g., as a BPCF with respect to the BNG), and as a PEP for a Policy and Charging Rules Function (PCRF) (which may be a Policy Decision Point/policy server (PDP)) in the mobile network domain (e.g., as a BBERF or as a PCEF, with respect to a PCRF in a 3GPP mobile network domain).

In another embodiment, the present invention is directed to an improvement in a method of policy interworking between a broadband fixed network domain and a mobile network domain. The interworking method uses a Broadband Policy Control Function (BPCF) as a first policy server in the fixed network domain and a Policy and Charging Rules Function (PCRF) as a second policy server in the mobile network domain. The improvement comprises: eliminating the use of the BPCF from the fixed network domain, and using the PCRF as a common policy server for both the fixed and the mobile network domains, wherein the mobile network domain comprises a 3GPP-Evolved Packet Core (preferably having a Policy and Charging Control (PCC) architecture).

In a further embodiment, the present invention is directed to a method of facilitating policy convergence of a mobile network domain with a broadband fixed network domain. The mobile network domain preferably comprises a 3GPP-Evolved Packet Core. The method comprises the steps of: providing a network element in the mobile network domain; coupling the network element to a PCRF in the mobile network domain and to a BNG in the fixed network domain; and configuring the network element to function as a PDP for the BNG in the fixed network domain and as a PEP for the PCRF in the mobile network domain.

In another embodiment, the present invention is directed to a method that comprises: sending a policy query from a BNG in a broadband fixed network domain to a network element in a mobile network domain that is functioning as a PDP for the BNG; and receiving a policy decision at the BNG from the network element.

In a still further embodiment, the present invention is directed to a method that comprises performing the following using a network element in a mobile network domain, wherein the mobile network domain comprises a 3GPP Evolved Packet Core (preferably having a Policy and Charging Control (PCC) architecture) and wherein the network element is coupled to a PCRF in the mobile network domain and to a BNG in a broadband fixed network domain: (i) receiving a policy query from the BNG using the network element as a PDP for the BNG, wherein the query is received from the BNG in a first protocol format associated with the fixed network domain; (ii) translating the query from the first protocol format into message in a second protocol format associated with the mobile network domain; and (iii) transmitting the message to the PCRF using the network element as a PEP for the PCRF in the mobile network domain.

The present invention thus builds from existing FMC interworking architecture (as shown, for example, in FIG. 1) towards a convergence solution—at least in the policy area—by means of a translation agent (i.e., the Mediation Entity). The Mediation Entity (ME)-based policy convergence solution according to the present invention allows leveraging on the currently standardized 3GPP-EPC architecture and features with regard to 3GPP core network domain (e.g., as disclosed by TS 23.203, which envisages a variety of access network scenarios allowing UE's data communications, such as GERAN/UTRAN/E-UTRAN/WLAN accesses), so that the 3GPP-PCC architecture and features can be also used by nodes of Broad Band Fixed network domains and, thus, benefit from the 3GPP-EPC architecture in respect to policy decisions to be made for the users of the fixed network domains with minimal implementation impact. The Mediation Entity could be easily introduced in the networks of fixed service providers, guaranteeing the interconnection towards a convergent PCRF without impacting the existing BNGs configuration and network infrastructure (of fixed domains). The Mediation Entity also removes the need for a specific policy server in the fixed domain. Only the PCRF can now provide policy control for both fixed (BBF) and mobile (3GPP) domains.

BRIEF DESCRIPTION OF THE DRAWINGS

In the following section, the invention will be described with reference to exemplary embodiments illustrated in the figures, in which.

DETAILED DESCRIPTION

Figure 1:
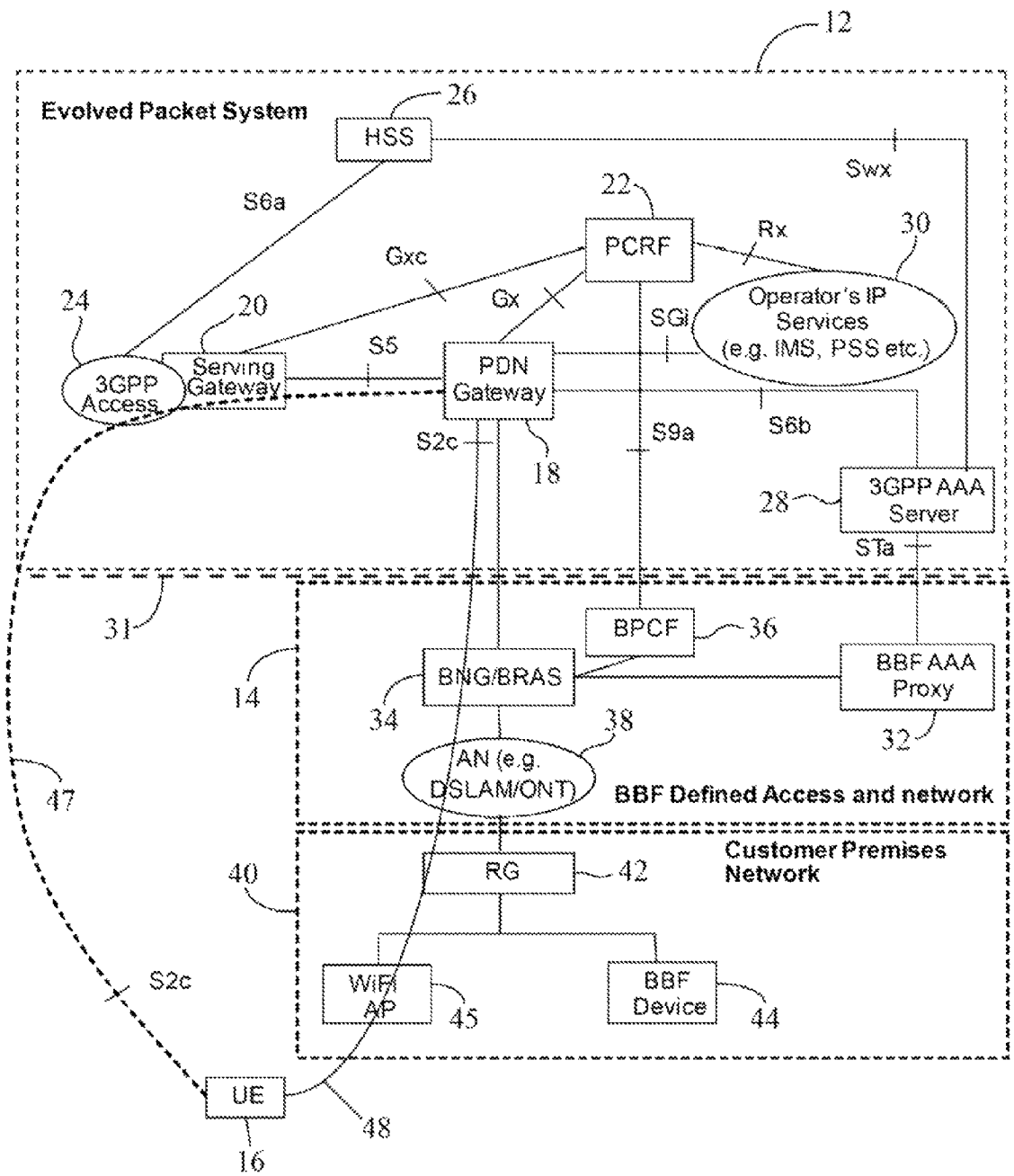
FIG. 1 shows an exemplary FMC (BBF-3GPP) interworking architecture depicted in 3GPP TS 23.139.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a 3GPP network, the invention or its principles can be implemented in other forms of mobile networks, as well as cellular or non-cellular wireless networks, whether 3GPP based or not (for example, a corporate-wide wireless data network, a point-to-point wireless communication network such as a wireless walkie-talkie network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term (e.g., UE) may include its plural forms (e.g., UEs) and a plural term may include its singular form. Similarly, a hyphenated term (e.g., "domain-specific," "3GPP-based" etc.) may be occasionally interchangeably used with its non-hyphenated version (e.g., "domain specific," "3GPP based," etc.), a capitalized entry (e.g., "Broad Band" or "BroadBand," "Service Provider," etc.) may be interchangeably used with its non-capitalized version (e.g., "broadband", "service provider," etc.), and plural terms may be indicated with or without an apostrophe (e.g., UE's or UEs, PDP's or PDPs, etc.). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including component diagrams) shown and discussed herein are for illustrative purpose only, and are not drawn to scale.

Figure 2:
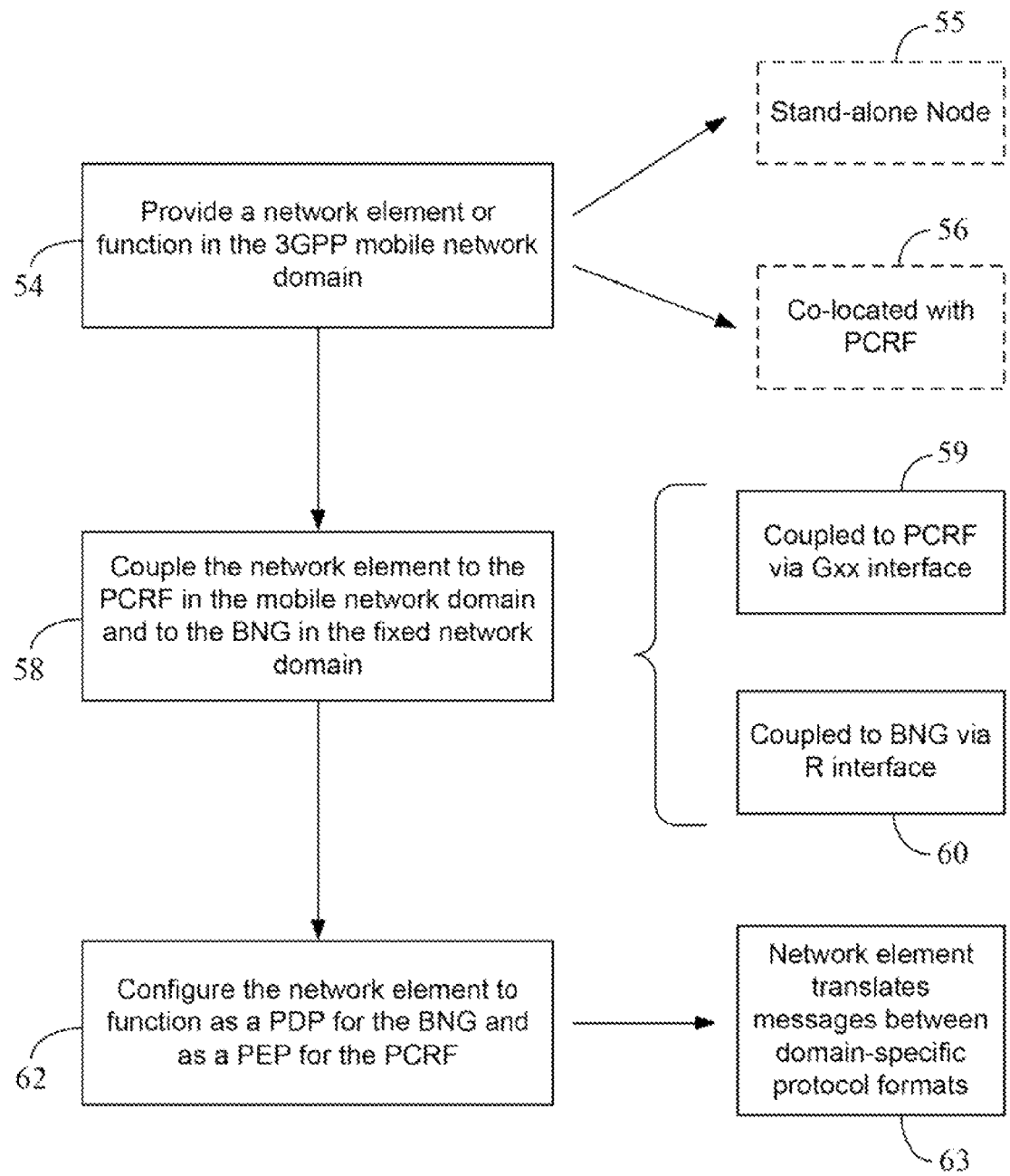
FIG. 2 illustrates an exemplary flowchart of a method to facilitate policy convergence of mobile and fixed network domains according to one embodiment of the present invention.
Figure 3:
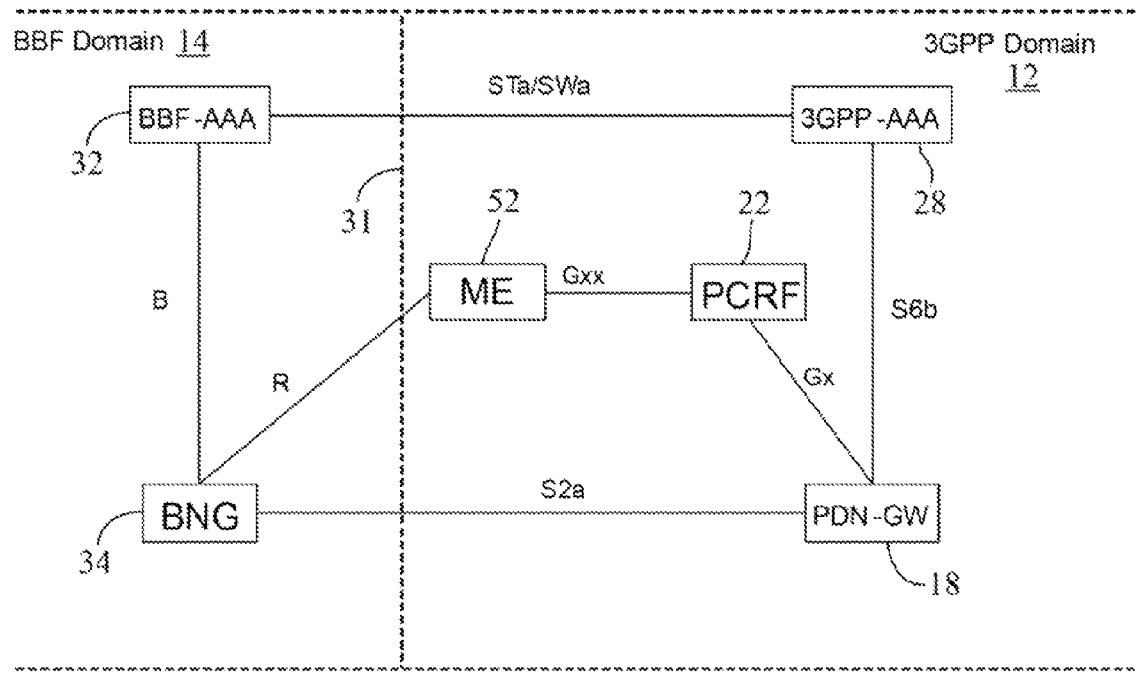
FIG. 3 depicts a portion of the Fixed-Mobile Convergence (FMC) architecture that includes a Mediation Entity (ME) in the mobile domain according to one embodiment of the present invention.

FIG. 2 illustrates an exemplary flowchart 50 of a method to facilitate policy convergence of mobile and fixed network domains according to one embodiment of the present invention. According to a method of the present invention, a network element or function—referred to herein as a Mediation Entity (ME) and shown as ME 52 in FIGS. 3-5 discussed later below—is provided (block 54, FIG. 2) in the 3GPP mobile network domain to facilitate convergence of the fixed and mobile domains in the policy management area. The network element or function may be implemented in the 3GPP mobile domain in a number of different ways. For example, the ME 52 can be a stand-alone node as shown in the embodiment of FIG. 3 (block 55) or can be co-located within a node implementing the PCRF functionality (block 56). It is noted here that either of the terms "network element" or "network function" (which are used interchangeably herein) may refer to a network entity or node that can be a processor, a server, a computing unit, a data processing unit, or any other combination of hardware and software to accomplish the functionality generally shown at blocks 58 and 62 in FIG. 2 and discussed in more detail below with reference to FIGS. 3-5. As shown in FIG. 2, the ME 52 may be introduced between the BBF BNG (e.g., the BNG 34 in FIG. 3) and the 3GPP PCRF (e.g., the PCRF 22 in FIG. 3)—i.e., the ME 52 can be coupled to the PCRF 22 in the mobile domain and to the BNG 34 in the fixed domain (block 58). In one embodiment, the ME 52 may be coupled to the PCRF 22 via the "Gxx" interface of the 3GPP mobile domain as shown in FIG. 3 (block 59) and to the BNG 34 via the "R" interface in the fixed domain as also shown in FIG. 3 (block 60). Alternatively, the ME 52 may be coupled to the PCRF 22 via the "Gx" interface of the 3GPP mobile domain (not shown in FIG. 3). The "Gx" and "Gxx" interfaces in a 3GPP mobile domain are disclosed by the aforementioned 3GPP TS 23.203 (e.g., in chapters 5.1, 5.2.2 and 5.2.7). The ME 52 may be configured to function as a PDP for the BNG 34 and as a PEP for the PCRF 22 (block 62). In one embodiment, with regard to the Broad Band Fixed network domain, the ME acts before the BNG (which is, in general, a PEP in the fixed domain) as a BPCF (i.e., as if ME were a PDP), and, with regard to a 3GPP-EPC network domain, the ME acts before the PCRF (which is, in general, a PDP in the mobile domain) as if it were a PEP of the 3GPP mobile network, which can be: a gateway implementing a BBERF (in which case the ME communicates with the PCRF via the "Gxx" interface) or a PCEF (in which case the ME communicates with the PCRF via the "Gx" interface). More precisely, the ME 52 behaves as a PDP (e.g., as a BPCF) for PEPs of the fixed domain routing data flows of UEs connected to said domain, but ME 52 is not actually deciding all the policies (e.g., QoS policies) which are to be enforced by these PEPs with respect to these flows. Instead, the ME 52 communicates with a PDP of the mobile network domain (e.g., a PCRF) as if it were a PEP in said mobile network domain (e.g., as if ME was a BBERF or a PCEF) and, as a result of said communication, it obtains from the PDP in the mobile network domain (e.g., the PCRF) the policies to be enforced by the PEPs in the fixed network domain for these flows. This function of the ME 52 with respect to the mobile network domain is referred herein, for simplicity, as the ME 52 "being configured as a PEP (e.g., BBERF or PCEF) for a PDP (e.g., PCRF) of the mobile network domain"; although, it is noted here that the ME (which is communicating with a PCRF either via a "Gxx" interface (as if the ME were a BBERF) or via a "Gx" interface (as if the ME were a PCEF)) may not be actually enforcing policies over the aforementioned data flow, but rather transmitting these policies (as decided by the PDP/PCRF of the mobile network) to the PEPs (BNGs) of the broadband fixed domain.

In one embodiment, to facilitate policy convergence between fixed and mobile domains, the ME 52 may be configured to function as a translation agent to facilitate exchange of messages between the BNG 34 and the PCRF 22 by translating messages received from the BNG 34 in a fixed domain-specific protocol format (e.g., the RADIUS protocol) into messages transmitted to the PCRF 22 in a mobile domain-specific protocol format (e.g., the Diameter protocol), and vice versa as indicated at block 63 in FIG. 2.

FIG. 3 depicts a portion of the Fixed-Mobile Convergence (FMC) architecture that includes a Mediation Entity (ME) 52 in the mobile domain according to one embodiment of the present invention. It is noted here that FIG. 3 is a modified version of FIG. 1 focusing on the interactions between the BNG 34 and the PCRF 22 via the ME 52. Because relevant portions in FIGS. 1 and 3 are identical, the same reference numerals are used in FIGS. 1 and 3 to refer to identical parts or parts having substantially similar functionality. However, for the sake of brevity, discussion of such identical parts (e.g., network entities, reference points, etc.) is not repeated in the context of discussion of FIG. 3 because of their earlier discussion in the context of FIG. 1. Furthermore, only relevant domain-specific architectural details from FIG. 1 are shown in FIG. 3—for the BBF fixed domain 14 and the 3GPP mobile domain 12—to highlight usage of the mobile domain-based ME 52 as a "link" or "translation agent" between the PCRF 22 in the mobile domain 12 and the BNG 34 in the fixed domain 14, which allows to minimize the number of policy servers (i.e., PDPs such as BPCFs or PCRFs) intervening in the fixed and mobile domains for making policy decisions for a data communication of a UE. For example, when the dual PDP-based interworking scenario of FIG. 1 is compared with the ME-based convergence solution shown in FIG. 3, it is observed that there is no BPCF in the BBF domain 14 in the embodiment of FIG. 3. In other words, using the ME 52 (which simulates to be a policy enforcing point PEP—e.g., BBERF or PCEF—in the mobile domain 12), the BPCF (i.e., the PDP in the fixed domain) may be eliminated, thereby making the PCRF 22 as the single policy server providing policy control for, both, fixed broadband and mobile accesses.

Thus, by using the ME 52, the BNG 34 can interwork with the PCRF 22 node in a transparent manner, enabling a simplified use of the 3GPP PCC architecture for FMC scenarios. By means of the 3GPP-based ME 52 (when implemented as a stand-alone node, or by a 3GPP-PCC compliant PCRF as mentioned before) between the BBF BNG 34 and the 3GPP PCRF 22, it's possible to reuse the 3GPP PCC architecture as the policy and charging control framework for FMC convergence without impacting the current policy systems of Fixed Access Service Providers. Such architecture is shown in FIG. 3 in which the ME 52 is coupled to the PCRF via the Gxx interface in the 3GPP domain, and to the BNG 34 via the R interface in the fixed domain. Alternatively, and as referred earlier, the ME can communicate with the PCRF of the mobile network domain via the "Gx" interface. The "Gxx" and "Gx" interfaces refer to communication points between a PCRF (i.e., a policy decision point (PDP) or policy server in the 3GPP-PCC architecture) and, respectively, a BBERF ("Gxx" reference point in said case) or a PCEF ("Gx" reference point in said case) (i.e., a PEP in the 3GPP-PCC architecture, which is commonly implemented in a gateway routing data packets relating to data communications of UEs). Details of communications (i.e., basic contents and functionality) between a PCRF and the gateways (such as a BBERF and/or a PCEF, which intervene in a communication of a UE) that commonly implement the enforcing functionalities for enforcing the policy decisions made by the PCRF are disclosed in TS 23.203, for example, in chapters 7.2 and 7.7 thereof.

Because FIG. 3 depicts a convergence architecture, the so called "S2a" reference point between the BNG 34 in the Fixed Broadband Domain (illustrated as the BBF Domain 14) and the PDN-Gw 18 in the 3GPP-EPC domain (illustrated as the 3GPP Domain 12) may be deployed. Furthermore, the BNG 34 may be coupled to the BBF-AAA 32 via the "B" interface in the fixed domain 14, the BBF-AAA 32 may be coupled to the 3GPP-AAA 28 via the STa or SWa inter-domain interface, and the 3GPP-AAA 28 may be coupled to the PDN-Gw 18 via the S6b interface in the 3GPP mobile domain 12 as shown in FIG. 3. Finally, the "boundary" between the fixed and mobile domains is also shown in FIG. 3 by the dotted line 31.

As a "translation agent" between the BNG 34 and the PCRF 22, the Mediation Entity 52 is responsible for changing any RADIUS Accounting message coming from the BNG 34 into a 3GPP Gateway Control Session procedure (Gateway Control Session Establishment for Accounting Start, QoS Rules Requests for Accounting Update or Gateway Control Session Termination for Accounting Stop) to support the 3GPP "pull" model discussed earlier. On the other hand, the Mediation Entity 52 may transform the QoS Rules provided by the PCRF 22 into the QoS parameters that the BNG 34 handles (like Differentiated Services Code Point (DSCP), scheduling profiles, etc.). In one embodiment, the Mediation Entity 52 then sends those QoS parameters in a RADIUS COA message towards the BNG 34 to support the BBF "push" model discussed earlier. The BNG 34 can then enforce the applicable policies. Thus, the ME 52 may receive policy rules from the PCRF 22 over the Gxx interface, and convert those rules into the kind of policy rules that a BNG (e.g., the BNG 34) understands. For instance, 3GPP QoS rules are based on the QoS Class Identifier (QCI) concept and, in one embodiment, this QCI may be managed by the 3GPP PDN-Gw 18. However, this QCI is not known to the BBF BNG 34, which makes use of DSCP marking. In that case, the relationship between the QCI value and the DSCP mark may be done by the ME 52. Besides, in one embodiment, when the PCRF 22 demands unsolicited QoS Rules provisioning (i.e., not related with any RADIUS Accounting received in the fixed network 14), the Mediation Entity 52 may receive such query from the PCRF 22, convert the 3GPP mobile domain-specific QoS Rules into fixed domain-specific QoS parameters, and send such data (i.e., QoS parameters) included in RADIUS COA messages towards the BNG 34 in the fixed network domain 14.

In summary, from the perspective of a broadband fixed domain (BBF), the Mediation Entity 52 appears as a BPCF, while from a (3GPP) mobile network domain point of view, the Mediation Entity 52 appears as a BBERF, or as a PCEF. However, the ME 52 in FIG. 3 is clearly distinguishable from the BPCF 36 in FIG. 1 in the sense that ME 52 preferably belongs to the 3GPP mobile domain 12 (and, hence, is preferably owned and/or operated by the owner/operator of a network in the mobile domain 12) whereas the BPCF 36 belongs to the fixed domain 14 (and, hence, is owned and/or operated by the owner/operator of a network in the fixed domain 14). It is understood that in certain embodiments, there may be the same owner/operator/service provider for both the networks—i.e., a network in the mobile domain 12 and a network in the fixed domain 14. Furthermore, although ME 52 may be a stand-alone element or part of a node implementing the PCRF functionality, the BPCF 36 is just a stand-alone node belonging to the fixed access provider. Additionally, the ME 52 has a different functional behavior than the BPCF 36 because, from the PCRF point of view, the ME "appears" as a BNG (because there is no BPCF in the embodiment of FIG. 3), whereas the BPCF 36 functions as a PDP in the fixed domain 14 for roaming/interworking purposes and interacts with the PCRF 22 as a BPCF and not as a BNG. Also, although FIG. 1 and FIG. 3 (which is a modified version of relevant portions in FIG. 1) depict the FMC architectures related to a non-roaming situation, the ME 52 according to one embodiment of the present invention may be used in a roaming FMC architecture as well (examples of such roaming architectures are shown in 3GPP TS 23.139). For example, for 3GPP roaming cases, an ME in the visited network may interwork with the Visited PCRF (V-PCRF) (not shown) via the respective Gxx interface and the V-PCRF, in turn, may interact with the Home-PCRF (H-PCRF) (not shown) via the 3GPP S9 interface.

It is understood in the context of FIG. 3 that although a UE (like the UE 16 in FIG. 1) is not shown in FIG. 3, the configuration of FIG. 3 may be used in the architectural layout of FIG. 1 (with BPCF 36 removed as mentioned before) so that the ME-based fixed-mobile policy convergence architecture shown in FIG. 3 may be implemented in the context of policy decisions and enforcement (i.e., policy management) for a data communication of a UE (e.g., the UE 16). The term "user equipment" or "UE" may be interchangeably used with such other terms as "mobile handset," "wireless handset," "terminal," etc., to refer to a wireless communication device that is capable of voice and/or data communication via a wireless carrier network (e.g., a wireless network in the mobile domain 12). Some examples of such mobile handsets or UEs include cellular telephones or data transfer equipments (e.g., a Personal Digital Assistant (PDA) or a pager), smartphones (e.g., iPhone™, Android™, Blackberry™, etc.), computers, Bluetooth® devices, or any other type of user devices capable of operating in a wireless environment. A wireless network in the 3GPP domain 12 may be a cellular telephone network or a Public Land Mobile Network (PLMN) in which the UE 16 may be a subscriber unit. However, the present invention is operable in other non-cellular or non-standard based wireless networks as well (whether voice networks, data networks, or both including, for example, proprietary corporate wireless networks, point-to-point communication networks like walkie-talkie systems, etc.). Furthermore, portions of the mobile domain 12 may include, independently or in combination, any of the present or future wireline or wireless communication networks such as, for example, the Public-Switched Telephone Network (PSTN), or a satellite-based communication link. Some additional examples of 3GPP-based wireless communication systems or networks that may be part of the mobile domain 12 include, but not limited to, Third Generation (3G) and Fourth Generation (4G) cellular networks like High Speed Packet Access (HSPA) networks, Evolution-Data Optimized (EV-DO) networks, Long Term Evolution (LTE) networks, Worldwide Interoperability for Microwave Access (WiMAX) systems, International Mobile Telecommunications-Advanced (IMT-Advanced) (e.g., LTE Advanced) systems, etc. Additional examples of 3GPP-based wireless networks that may be part of the mobile domain 12 include Global System for Mobile communications (GSM) networks, Wideband Code Division Multiple Access (WCDMA) systems, WCDMA-based HSPA systems, CDMA2000 systems, other UTRAN/E-UTRAN networks, GSM/Enhanced Data Rate for GSM Evolution (GSM/EDGE) systems, etc. Some exemplary fixed access networks that may be part of the BBF domain 14 include Broadband Integrated Services Digital Networks (B-ISDN), Asynchronous Transfer Mode (ATM) based broadband networks, Digital Subscriber Line (DSL) networks (including xDSL networks), cable broadband networks (including fiber optic networks), etc.

Figure 4:
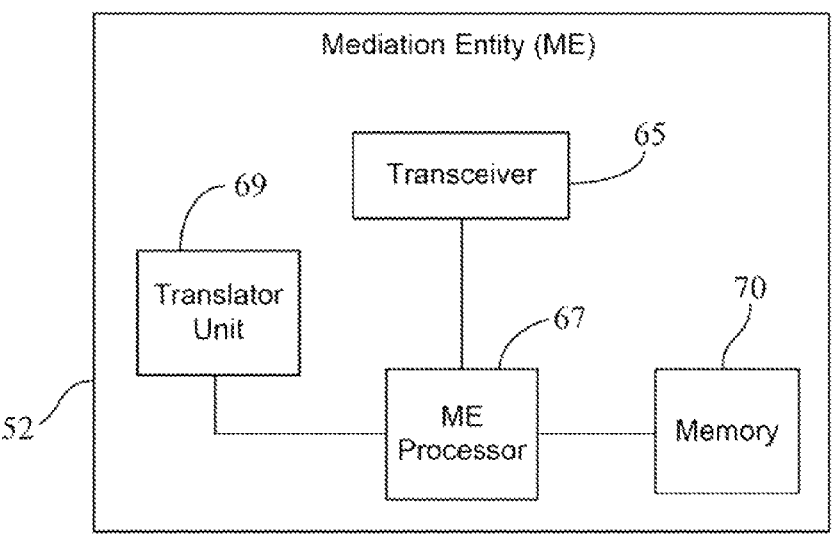
FIG. 4 is a block diagram of an exemplary ME according to one embodiment of the present invention.

FIG. 4 is a block diagram of an exemplary ME (e.g., the ME 52 in FIG. 3) according to one embodiment of the present invention. The ME 52 may include a transceiver unit 65 (which may comprise a transmitter-receiver pair (not shown)) adapted to receive/transmit messages from/to a gateway (e.g., the BNG 34) in the fixed broadband network 14 and to/from a PDP in the 3GPP network 12 (e.g., the PCRF 22). The ME 52 may further include one or more processors (e.g., the processor 67 in FIG. 4) coupled to the transceiver unit 65 to parse the content of messages received from the transceiver unit 65 (e.g., from the BNG 34 or the PCRF 22). Thus, the processor 67 may determine which second message—and which contents in that second message—is to be sent from the ME 52 towards a second network domain (which can be either the BBF domain 14 or the 3GPP domain 12) upon reception of a first message received from a first domain (which can be either the 3GPP domain 12 or the BBF domain 14, respectively). To assist the processor 67 in such determination, the ME 52 may also include a translator unit 69 coupled to the processor 67 and driven thereby. The translator unit 69 may execute necessary translation of messages and contents (e.g., to/from domain-specific protocol formats, such as translation of RADIUS protocol-based messages into Diameter protocol-based messages and vice versa). The ME 52 may include a memory unit 70 coupled to the processor 67 to at least temporarily store messages received or messages waiting for translation or transmission. In one embodiment, the memory 70 may be part of the processor 67 itself. In certain other embodiments, the memory 70 may be optional, for example, when there is no need for any storage of any messages or process results (e.g., when translation of messages is being performed in real-time or substantially in real-time). Thus, the physical (as well as functional) components 65, 67, 69, and 70 (which may form a combination of processing and communication means of the ME 52) may allow the ME 52: (1) to process, translate and transmit policy queries received in the ME from the BNG 34 (commonly based on RADIUS protocol messages) into Gateway Control Session messages towards the PCRF 22 (commonly based on Diameter protocol messages) via the "Gxx" interface as if these policy queries were originated by the ME 52 (e.g., to support the 3GPP "pull" model discussed earlier), and/or (2) to process, translate and transmit policy decisions received in the ME from the PCRF 22 (e.g., via Diameter protocol messages) to the BNG 34 (e.g., via RADIUS protocol messages) as if these policy decisions were made by the ME 52 (e.g., to support the BBF "push" model discussed earlier).

The processor 67 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As discussed below, some or all of the functionalities described above as being provided by the ME 52 may be provided by the processor 67 executing instructions stored on a computer-readable data storage medium, such as the memory 70 shown in FIG. 4.

It is noted here that the components 65, 67, 69, 70 in FIG. 4 may be physically implemented by an apparatus such as, for example, a server, a general purpose computer, a data processing unit, or any other programmable computing unit. Such apparatus may be either implemented in a co-located manner with a server machine already implementing a PDP functionality (such as, within a server implementing a PCRF functionality), or implemented as a stand-alone dedicated server machine (e.g., as shown in the configuration of FIG. 3). Thus, the ME 52 may be configured (in hardware, via software, or both) to implement the "translation agent" functionality as discussed herein. For example, in one embodiment, at least a portion of the functionalities of the ME 52 may be implemented through suitable programming of one or more processors (e.g., processor 67 in FIG. 4) in the ME 52. The execution of the program code (by the processor 67) may cause the processor to control transmissions/receptions of messages by the transceiver unit 65, and process/translate messages with the help of the translator unit 69 and the memory module 70 as discussed herein. Thus, in the discussion herein, although the ME 52 may be referred to as "performing," "accomplishing," or "carrying out" a function or process, it is evident to one skilled in the art that such performance may be technically accomplished in hardware and/or software as desired.

In one embodiment, the program code or instructions may be part of a computer program, software, or firmware incorporated (in a non-transitory manner) in a computer-readable storage medium (e.g., the memory 70 in FIG. 4) or embodied (also in a non-transitory manner) in a signal such as a downloadable data signal provided from an Internet website (not shown) for execution by a general purpose computer or a processor (e.g., the processor 67 in FIG. 4). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

Alternative embodiments of the ME 52 may include additional components beyond those shown in FIG. 4 for providing additional functionality, including any of the functionality discussed above and/or any functionality necessary to support the solution described above. Although features and elements are described above in particular combinations, each feature or element can be used alone without the other features and elements or in various combinations with or without other features and elements.

Figure 5:
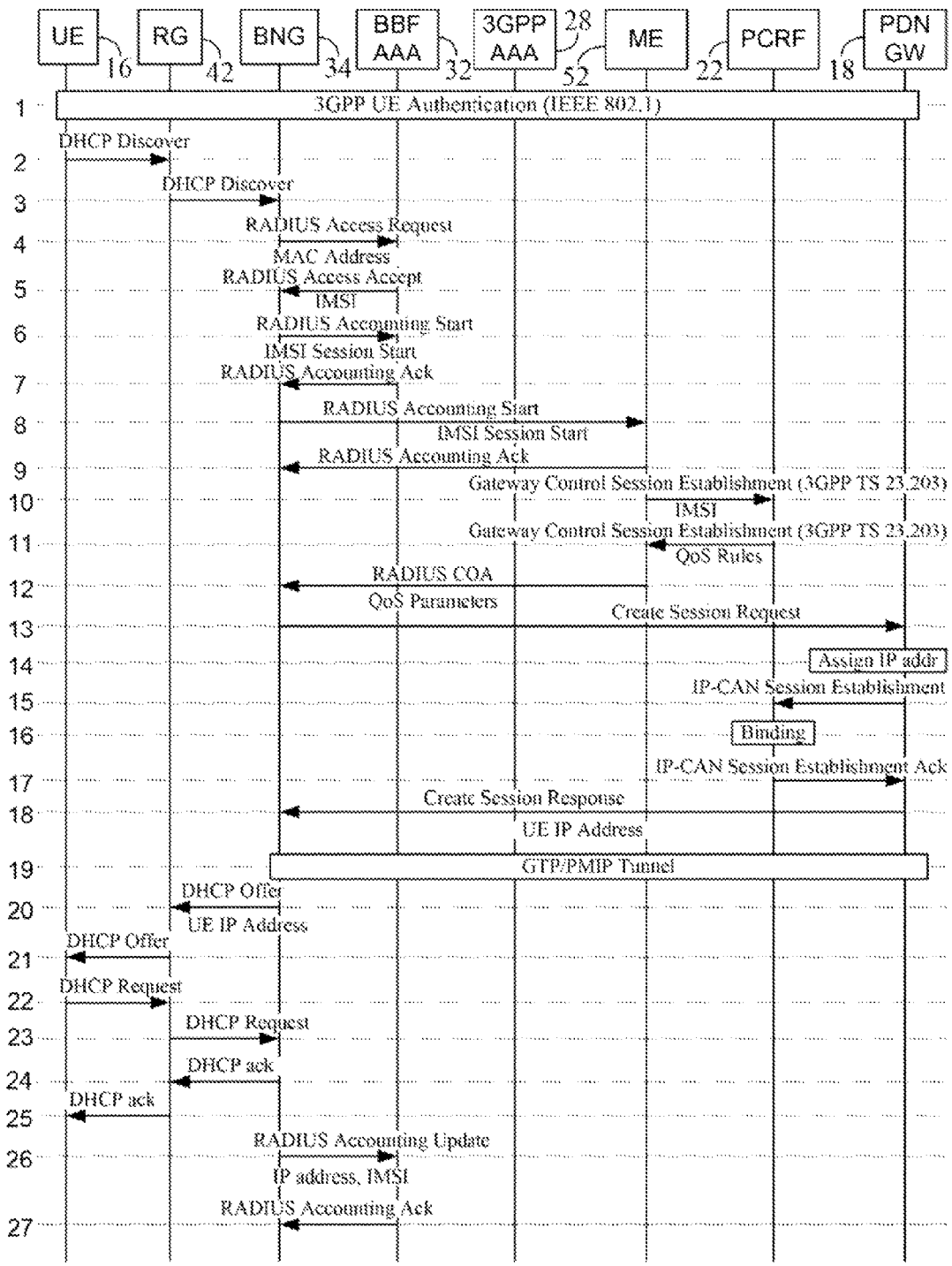
FIG. 5 is an exemplary messaging scheme illustrating functionality of the Mediation Entity in the context of a session establishment according to one embodiment of the present invention.

FIG. 5 is an exemplary messaging scheme illustrating functionality of the Mediation Entity 52 in the context of a session establishment according to one embodiment of the present invention. The exemplary messaging scheme in FIG. 5 describes the function of the ME 52 in case of the previously-mentioned BNG sidecar mode. It is observed here that the sequence of steps shown in FIG. 5 are for illustration only. In other embodiments, different sequence(s) of tasks may be executed or different set(s) of network elements may interact with the ME 52 as per particular session requirements. In the discussion below, each numbered step in FIG. 5 is described in more detail (in the context of configurations in FIGS. 1 and 3), while maintaining the correspondence between the step numbers given below and those shown in FIG. 5.

1. The 3GGP UE 16 accessing to a WLAN access (e.g., through the customer premises network 40) is authenticated (in the BBF and 3GPP domains) through IEEE 802.1 procedures. Such authentication mechanism is not relevant here and, hence, is not described in further detail. The BBF network 14 assumes that the 3GPP UE 16 is authenticated and can make use of the network.

2. The 3GPP UE 16 sends a Dynamic Host Configuration Protocol (DHCP) Discover message to the RG 42 (e.g., in the customer premises network 40) for assignment of an IP address to the UE 16.

3. The RG 42 forwards the DHCP Discover message to the BNG 34 in the broadband fixed network 14. The message reaches the BNG 34.

4. The BNG 34 sends a RADIUS Access Request message (containing Media Access Control (MAC) address of the WLAN associated with the UE 16) to the BBF AAA 32 in order to get the subscriber information associated with the UE 16.

5. The BBF AAA 32 indicates via an International Mobile Subscriber Identity (IMSI) parameter in the RADIUS Access Accept message to the BNG 34 that it is a 3GPP UE whose IP address shall be assigned by the 3GPP EPC network 12. This implies that the traffic for such user shall be routed via the 3GPP EPC network 12.

6. The BNG 34 sends a RADIUS Accounting Start message to the BBF AAA 32 for the purpose of handling an IMSI session involving the UE 16.

7. The BNG 34 receives the RADIUS Accounting Acknowledge message from the BBF AAA 32 in response to its RADIUS Accounting Start message.

8. The BNG 34 also sends a RADIUS Accounting Start message to the Mediation Entity 52 (sidecar mode) to start the IMSI session for the UE 16. Therefore, the Mediation Entity 52 acts before the BNG 34 as a BPCF of the BBF domain 14 for this and other signaling flows, as described below, and as illustrated by FIG. 3.

9. The Mediation Entity 52 acknowledges the RADIUS Accounting Start message from the BNG 34 by sending a RADIUS Accounting Acknowledge message to the BNG 34.

10. The Mediation Entity 52 converts the BBF domain-based RADIUS Accounting Start message (from the BNG 34), and its contents, into a 3GPP domain-based Gateway Control Session Establishment message (i.e., a Diameter Charging and Control Request (CCR)) and sends this Gateway Control Session Establishment message to the PCRF 22 via the "Gxx" or the "Gx" interface. Therefore, the Mediation Entity 52 acts before the PCRF 22 as if it were a gateway implementing a BBERF or a PCEF functionality for this and other signaling flows, as described below, and as illustrated by FIG. 3. An example describing how the Mediation Entity 52 performs this task is given later below. As indicated in FIG. 5, the Gateway Control Session Establishment message may be in compliance with 3GPP TS 23.203.

11. The PCRF 22 provides the applicable QoS Rules to the Mediation Entity 52 via another 3GPP TS 23.203 based Gateway Control Session Establishment message.

12. The Mediation Entity 52 changes the content of the 3GPP-based QoS Rules received from the PCRF 22 into the BBF-based QoS information parameters that the BNG 34 manages (e.g., DSCP codes, scheduling profiles, etc.), and sends a RADIUS COA with such parameters to the BNG 34 for being enforced therein. Therefore the Mediation Entity 52 behaves, with respect to the BNG 34, as if it were a Policy Decision Point (PDP) of the broadband fixed network domain 14 (i.e., as a BPCF). An example of how this is done is given later below.

13. Using a Create Session Request, the BNG 34 requests the creation of either a GPRS Tunnel Protocol (GTP) or a Proxy Mobile IP (PMIP) tunnel with the PDN-Gw 18.

14. The PDN-Gateway 18 assigns the applicable IP address for the subscriber (i.e., the UE 16).

15. The PDN-Gateway 18 sends an IP Connectivity Access Network (IP-CAN) Session Establishment request to the PCRF 22.

16. The PCRF 22 binds the IP-CAN Session with the Gateway Control Session created in step 10 above.

17. The PCRF 22 responds to the IP-CAN Session Establishment request (from the PDN-Gw 18) by sending an IP-CAN Session Establishment Acknowledge message (to the PDN-Gw 18), including the applicable 3GPP PCC Rules. The PDN-Gateway 18 can then enforce such PCC Rules.

18. The GTP or PMIP tunnel request is completed—as indicated by a Create Session Response (containing UE's IP address as assigned by the PDN-Gw 18 at step 14) from PDN-Gw 18 to the BNG 34.

19. The GTP or PMIP tunnel is established between the BNG 34 and the PDN-Gw 18.

20. The BNG 34 sends the DHCP offer to the RG 42, including the UE's assigned IP address.

21. The RG 42 forwards the DHCP offer to the 3GPP UE 16.

22. The 3GPP UE 16 selects the offered IP Address. Then the 3GPP UE 16 sends the DHCP Request to the RG 42.

23. The RG 42 forwards the DHCP Request to the BNG 34.

24. The BNG 34 acknowledges the DHCP Request via a DHCP Acknowledge to the RG 42. The IP address (of the UE 16) is now confirmed.

25. The RG 42 forwards the DHCP Acknowledge to the 3GPP UE 16.

26. The BNG 34 sends a RADIUS Accounting Update for such IP Address (and IMSI) to the BBF AAA 32. Although not shown in FIG. 5, the BNG 34 forwards the same RADIUS Accounting Update also to the ME 52 (which acts as a BPCF for the BNG 34). This message confirms the WEAN session establishment for the UE 16.

27. Both the BBF AAA 32 and the ME 52 (i.e., acting as a BPCF) acknowledge the reception of the RADIUS Accounting Update via respective RADIUS Accounting Acknowledge messages to the BNG 34. In FIG. 5, such acknowledgment from only the BBF AAA 32 is shown.

As mentioned earlier, the exemplary messaging scheme in FIG. 5 relates to the BNG sidecar mode. However, it is observed here that when the earlier-described proxy mode is used instead, step-8 in FIG. 5 may be modified so that the RADIUS Accounting Start message is sent from the BBF AAA 32 to the ME 52 (instead of from the BNG 34 to the ME 52 as in case of the sidecar mode of FIG. 5), and step 9 in FIG. 5 may be modified so that the RADIUS Accounting Acknowledge is sent from the ME 52 to the BBF AAA 32 (instead of from the ME 52 to the BNG 34 as in case of the sidecar mode of FIG. 5). The rest of the steps and their contents shown in FIG. 5 may remain the same in case of such proxy mode.

The discussion below provides some examples of messages that may be used at ME-related steps 8, 10, 11, and 12 shown in FIG. 5 and discussed above. It is emphasized here that these examples are provided for explanatory purpose only and, hence, they should not be construed as limiting or restricting the functionality of the Mediation Entity 52 of the present invention. In different embodiments, the ME 52 may be configured to employ messaging different from the examples given below or entirely different messaging schemes. The goal of the examples below is to describe how the Mediation Entity 52 makes the needed protocol conversions (from BBF domain-based protocol format to 3GPP domain-based protocol format, and vice versa) and triggers the requested functionality. Because of their exemplary nature, the messages given below do not contain the whole set of parameters that both Internet Engineering Task Force (IETF) for RADIUS and 3GPP for Gxx describe. Only a few parameters relevant for the example are provided.

As discussed earlier, in step 8 of FIG. 5, the Mediation Entity 52 receives the BBF domain-based RADIUS Accounting Start message from the BNG 34. In one embodiment, such message can include the following parameters:

```
Accounting-Request ::= <RADIUS Header>
    [ Acct-Authentic ]
    [ Acct-Session-Id ]
    [ Acct-Status-Type ]
    [ NAS-Identifier]
    [ NAS-IP-Address ]
    [ NAS-Port ]
    [ NAS-Port-Id ]
    [ NAS-Port-Type ]
    [ Service-Type ]
    [ Session-Timeout ]
    [ Termination-Action ]
    [ User-Name ]
    * [ Vendor-Specific ]
```

In the above message, the acronym "NAS" refers to "Network Access Server," and the "User-Name" attribute is used for identifying the 3GPP subscriber (i.e., the IMSI of the UE 16 in 3GPP).

The Mediation Entity 52 first acknowledges the RADIUS Accounting-Request as indicated at step-9 in FIG. 5. Then, the ME 52 triggers the 3GPP Gateway Control Session Establishment message as shown at step-10 in FIG. 5. For such purpose, the ME 52 sends a Charging and Control Request (CCR) message (e.g., via the Gxx or Gx interface) to the PCRF 22 as part of the 3GPP domain-based messaging at step-10 in FIG. 5. The following is an example of the Gxx CCR message comprising the most relevant contents (usually referred to as "Attribute-Value Pairs" or AVP):

```
<CC-Request> ::=    < Diameter Header: 272, REQ, PXY >
                    < Session-Id >
                    { Auth-Application-Id }
                    { Origin-Host }
```

-continued

```
                { Origin-Realm }
                { Destination-Realm }
                { CC-Request-Type }
                { CC-Request-Number }
                [ Destination-Host ]
                [ Origin-State-Id ]
               *[ Subscription-Id ]
                [ RAT-Type ]
                [ IP-CAN-Type ]
               *[ AVP ]
```

In the above message, the abbreviation "REQ" stands for the term "request," the expression "PXY" refers to that the message is "proxyable", and the acronym "RAT" refers to "Radio Access Type". Furthermore, in the above CCR message, the Subscription-id parameter is used to identify the 3GPP subscriber (i.e., the IMSI of the UE 16 in 3GPP). Besides, the Mediation Entity 52 fixes the RAT-type to the access type of the UE 16. In the case of the embodiments in FIGS. 1 and 3, such access type can state, e.g., "Broadband". It is observed here that this RAT-type value, as well as the IP-CAN-Type value which can indicate, in this case, a connectivity access network reached through a "fixed broadband network") are not standardized yet, but information about them is preferably included in the message for indicating the UE's type of access to the PCRF 22.

The PCRF 22, taking into account that the subscriber is accessing the mobile domain 12 via a fixed broadband access, then decides the applicable QoS rules. The PCRF 22 then sends a Gxx Charging and Control Answer (CCA) to the ME 52 as part of the 3GPP Gateway Control Session Establishment message to the ME 52 at step-11 in FIG. 5. The following is an example of the Gxx CCA message:

```
    <CC-Answer> ::=   < Diameter Header: 272, PXY >
                      < Session-Id >
                      { Auth-Application-Id }
                      { Origin-Host }
                      { Origin-Realm }
                      [ Result-Code ]
                      { CC-Request-Type }
                      { CC-Request-Number }
                      [ QoS-Information ]
                     *[ AVP ]
```

For clarity and simplicity, it is assumed here that, in the above CCA message, the PCRF 22 just provides a QoS-Information AVP and not specific QoS-Rule-Install AVPs. The QoS-Information AVP may include the applicable QoS-Class-Identifier. So, in step-12 of FIG. 5, the ME 52 maps such QoS-Class-Identifier value into a specific QoS-Information attribute and includes this attribute in the BBF domain-specific RADIUS COA request towards the BNG 34. The following is an example of the RAIDUS COA request:

```
    CoA-Request ::=   <RADIUS Header>
                      { Acct-Session-Id }
                     * [Qos-Information]
```

Once the BNG 34 receives such QoS-Information, the BNG 34 can apply the specific QoS profiles (and then can enforce specific DSCP values to subscriber traffic packets) in the fixed broadband domain 14.

It is noted here that further messaging details (for various messages shown in FIG. 5) and details relating to any of the above-described implementations are not provided herein because, in view of the teachings of the present invention, one skilled in the art can implement the ME 52 in a mobile domain using customary knowledge and practice.

The foregoing describes a solution to the problem of convergence of the BBF fixed and 3GPP mobile network domains in the area of policy management. The present invention proposes one single policy server common to both of these domains. The single policy server—i.e., a PCRF in the mobile domain—can provide policy control for both fixed broadband and mobile accesses. A Mediation Entity (ME) in the 3GPP domain enables such PCRF approach, while minimizing the impacts on currently deployed fixed networks. The ME may be introduced as a 3GPP mobile domain-based network function or element between a fixed domain-based BNG and such PCRF. With regard to the broadband fixed network domain, the ME acts before the BNG as a BPCF (i.e., as if the ME were a PDP), and, with regard to the 3GPP-EPC mobile network domain, the ME acts before the PCRF as a gateway implementing a BBERF or as a PCEF, depending on the mobile domain's architecture (i.e., as if the ME were a PEP in the mobile domain). The ME can be implemented as a stand-alone node or can be co-located within a node implementing the PCRF functionality. Therefore, the legacy infrastructure currently used in fixed broadband networks is not impacted.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A network element in a mobile network domain coupled to a Policy and Charging Rules Function (PCRF) in the mobile network domain and to a Broadband Network Gateway (BNG) in a broadband fixed network domain, wherein the network element is configured to communicate with and to facilitate policy convergence of the mobile network domain with the broadband fixed network domain, wherein the mobile network domain comprises a Third Generation Partnership Project (3GPP) Evolved Packet Core, and wherein the network element comprises:

a processor configured to utilize the PCRF coupled to the network element as a common policy server for both the fixed and the mobile network domains by implementing the following:
        a Policy Decision Point (PDP) function when the network element communicates with the BNG in the broadband fixed network domain; and
        a Policy Enforcing Point (PEP) function when the network element communicates with the PCRF in the mobile network domain;
    whereby the use of a separate PDP function in the broadband fixed network domain is eliminated.

2. The network element of claim 1, wherein the PEP is one of the following:
    a gateway implementing Bearer Binding and Event Reporting Function (BBERF); and
    a Policy and Charging Enforcement Function (PCEF).

3. The network element of claim 1, wherein the PDP is a Broadband Policy Control Function (BPCF).

4. The network element of claim 1, further configured to be coupled to the BNG via an R reference point in the fixed network domain.

5. The network element of claim 1, further configured to be coupled to the PCRF via a Gxx reference point or via a Gx reference point in the mobile network domain.

6. The network element of claim 1, further configured to be co-located within a node implementing the PCRF functionality.

7. The network element of claim 1, further configured to facilitate exchange of messages between the BNG and the PCRF.

8. The network element of claim 7, further configured to translate messages received from the BNG in a first protocol format associated with the fixed network domain into messages transmitted to the PCRF in a second protocol format associated with the mobile network domain, and vice versa.

9. The network element of claim 8, wherein the first protocol format is based on the Remote Authentication Dial-In User Server/Service (RADIUS) protocol and the second protocol format is based on the Diameter protocol.

10. In a method of policy interworking between a broadband fixed network domain and a Third Generation Partnership Project (3GPP) Evolved Packet Core (EPC) mobile network domain using a Broadband Policy Control Function (BPCF) as a first policy server in the fixed network domain and using a Policy and Charging Rules Function (PCRF) as a second policy server in the mobile network domain, an improvement comprising:
providing a network element in the mobile network domain that is coupled to the PCRF and to a Broadband Network Gateway (BNG) in the fixed network domain; and
using the PCRF coupled to the network element as a common policy server for both the fixed and the mobile network domains;
whereby the use of the BPCF is eliminated from the fixed network domain.

11. The method of claim 10, wherein the step of using the PCRF coupled to the network element as a common policy server includes configuring the network element to function as:
a Policy Decision Point (PDP) when the network element communicates with the BNG in the fixed network domain; and
a Policy Enforcing Point (PEP) when the network element communicates with the PCRF in the mobile network domain.

12. The method of claim 11, wherein the providing step includes:
coupling the network element to the PCRF via a Gxx reference point or via a Gx reference point in the mobile network domain; and
coupling the network element to the BNG via an R reference point in the fixed network domain.

13. The method of claim 10, wherein the network element is configured to facilitate exchange of messages between the BNG and the PCRF regardless of domain-specific protocol formats for messages in the fixed and the mobile network domains.

14. A method of facilitating policy convergence of a mobile network domain with a broadband fixed network domain, wherein the mobile network domain comprises a Third Generation Partnership Project (3GPP) Evolved Packet Core, and wherein the method comprises the steps of:
providing a network element in the mobile network domain;
coupling the network element to a Policy and Charging Rules Function (PCRF) in the mobile network domain and to a Broadband Network Gateway (BNG) in the broadband fixed network domain; and
using the PCRF coupled to the network element as a common policy server for both the fixed and the mobile network domains by:
configuring the network element to function as a Policy Decision Point (PDP) for the BNG in the broadband fixed network domain; and
configuring the network element to function as a Policy Enforcing Point (PEP) for the PCRF in the mobile network domain;
whereby the use of a separate PDP in the broadband fixed network domain is eliminated.

15. The method of claim 14, wherein the step of coupling the network element includes:
coupling the network element to the PCRF via a Gxx reference point or via a Gx reference point in the mobile network domain; and
coupling the network element to the BNG via an R reference point in the fixed network domain.

16. The method of claim 14, wherein the step of providing the network element includes:
co-locating the network element within a node implementing the PCRF functionality.

17. The method of claim 14, wherein the step of using the PCRF coupled to the network element as a common policy server includes:
configuring the network element to translate messages received from the BNG in a first protocol format associated with the fixed network domain into messages transmitted to the PCRF in a second protocol format associated with the mobile network domain, and vice versa.

18. The method of claim 14, wherein the PDP is a Broadband Policy Control Function (BPCF), and wherein the PEP is one of the following:
a gateway implementing Bearer Binding and Event Reporting Function (BBERF), and
a Policy and Charging Enforcement Function (PCEF).

19. A method in a Broadband Network Gateway (BNG) in a broadband fixed network domain, the method comprising:
sending a policy query from the BNG in the broadband fixed network domain to a network element in a mobile network domain, wherein the network element is configured to function as a common policy server for both the fixed and the mobile network domains by functioning as a Policy Enforcing Point (PEP) function in the mobile network domain and as a Policy Decision Point (PDP) function for the BNG in the broadband fixed network domain; and
receiving a policy decision at the BNG from the network element;
whereby the use of a separate PDP function in the broadband fixed network domain is eliminated.

20. A method comprising:
using a network element in a mobile network domain as a common policy server for both a fixed network domain and the mobile network domain, wherein the mobile network domain comprises a Third Generation Partnership Project (3GPP) Evolved Packet Core and wherein the network element is coupled to a Policy and Charging Rules Function (PCRF) in the mobile network domain and to a Broadband Network Gateway (BNG) in a broadband fixed network domain, the using step comprising:
receiving a policy query from the BNG in the fixed network domain using the network element as a Policy Decision Point (PDP) for the BNG, wherein the query is received from the BNG in a first protocol format associated with the fixed network domain;

translating the query from the first protocol format into a
message in a second protocol format associated with
the mobile network domain; and
transmitting the message to the PCRF using the network
element as a Policy Enforcing Point (PEP) for the
PCRF in the mobile network domain;
whereby the use of a separate PDP in the broadband fixed
network domain is eliminated.

21. The method of claim 20, further comprising:
using the PCRF, processing the message received from the
network element and transmitting a first policy decision
in the second protocol format to the network element in
response thereto;
using the network element as the PEP for the PCRF, receiving the first policy decision from the PCRF and translating the first policy decision in the second protocol format
into a second policy decision in the first protocol format;
and
using the network element as the PDP for the BNG, sending the second policy decision in the first protocol format
to the BNG as a response to the policy query from the
BNG.

* * * * *

UNITED STATES PATENT AND TRADEMARK OFFICE
CERTIFICATE OF CORRECTION

PATENT NO. : 8,942,088 B2
APPLICATION NO. : 13/330794
DATED : January 27, 2015
INVENTOR(S) : Carnero Ros et al.

It is certified that error appears in the above-identified patent and that said Letters Patent is hereby corrected as shown below:

On the title page

Item 75 under "Inventors", in Column 1, Line 5, delete "Vasquez," and insert -- Vazquez, --, therefor.

On Page 2, item 56 under "OTHER PUBLICATIONS", in Column 2, Line 1, delete "S9" and insert -- S9* --, therefor.

In the specification

In Column 17, Line 61, delete "WEAN" and insert -- WLAN --, therefor.

Signed and Sealed this
Sixteenth Day of February, 2016

Michelle K. Lee
*Director of the United States Patent and Trademark Office*